(12) United States Patent
Lam

(10) Patent No.: US 7,696,261 B2
(45) Date of Patent: *Apr. 13, 2010

(54) MIXED DEPOSIT FRICTION MATERIAL

(75) Inventor: Robert C. Lam, Rochester, MI (US)

(73) Assignee: BorgWarner Inc., Auburn Hills, MI (US)

( * ) Notice: Subject to any disclaimer, the term of this patent is extended or adjusted under 35 U.S.C. 154(b) by 476 days.

This patent is subject to a terminal disclaimer.

(21) Appl. No.: 10/678,598

(22) Filed: Oct. 3, 2003

(65) Prior Publication Data

US 2005/0075413 A1  Apr. 7, 2005

(51) Int. Cl.
*C08K 3/04* (2006.01)
*C08K 3/34* (2006.01)
*C08J 5/14* (2006.01)

(52) U.S. Cl. .................. 523/149; 523/158; 523/159; 524/448; 524/495; 524/496; 524/700; 524/733; 428/297.4; 428/301.4

(58) Field of Classification Search .............. 523/149, 523/157, 158, 159; 524/448, 495, 496, 700, 524/733; 428/297.4, 301.4
See application file for complete search history.

(56) References Cited

U.S. PATENT DOCUMENTS

| | | | |
|---|---|---|---|
| 4,451,590 A | 5/1984 | Fujimaki et al. | |
| 4,524,169 A | 6/1985 | Wolff et al. | |
| 4,700,823 A | 10/1987 | Winckler | |
| 5,083,650 A | 1/1992 | Seiz et al. | |
| 5,395,864 A | 3/1995 | Miyoshi et al. | |
| 5,585,166 A | 12/1996 | Kearsey | |
| 5,646,076 A | 7/1997 | Bortz | |
| 5,662,993 A | 9/1997 | Winckler | |
| 5,707,905 A | 1/1998 | Lam et al. | |
| 5,753,356 A | 5/1998 | Lam et al. | |
| 5,816,901 A | 10/1998 | Sirany | |
| 5,856,244 A | 1/1999 | Lam et al. | |
| 5,858,883 A | 1/1999 | Lam et al. | |
| 5,952,249 A | 9/1999 | Gibson et al. | |
| 5,958,507 A | 9/1999 | Lam et al. | |
| 5,965,658 A | 10/1999 | Smith et al. | |
| 5,965,859 A | 10/1999 | Smith et al. | |
| 5,989,375 A | 11/1999 | Bortz | |
| 5,989,390 A | 11/1999 | Lee | |
| 5,998,307 A | 12/1999 | Lam et al. | |
| 6,001,750 A | 12/1999 | Lam | |
| 6,130,176 A | 10/2000 | Lam | |
| 6,194,059 B1 | 2/2001 | Yesnik | |
| 6,291,040 B1 | 9/2001 | Moriwaki et al. | |
| 6,352,758 B1 | 3/2002 | Huang et al. | |
| 6,387,531 B1 | 5/2002 | Bi et al. | |
| 6,601,321 B1 | 8/2003 | Kendall | |
| 6,630,416 B1 * | 10/2003 | Lam et al. ............ | 442/417 |

FOREIGN PATENT DOCUMENTS

| | | |
|---|---|---|
| EP | 0854305 | 7/1998 |
| EP | 1203897 | 5/2002 |
| EP | 1521001 | 4/2005 |
| EP | 1521007 | 4/2005 |

OTHER PUBLICATIONS

U.S. Appl. No. 10/234,976, filed Sep. 4, 2002, Chen et al.
U.S. Appl. No. 10/233,318, filed Aug. 30, 2002, Chen et al.
U.S. Appl. No. 10/218,019, Aug. 13, 2002, Lam et al.

* cited by examiner

*Primary Examiner*—Kriellion A Sanders
(74) *Attorney, Agent, or Firm*—Reising Ethington P.C.

(57) ABSTRACT

The present invention relates to a friction material having a fibrous base material as a primary layer and a secondary layer comprising a mixture of carbonaceous material and friction modifying particles on at least one surface of the primary layer for use as an anti-shudder friction material.

22 Claims, 13 Drawing Sheets

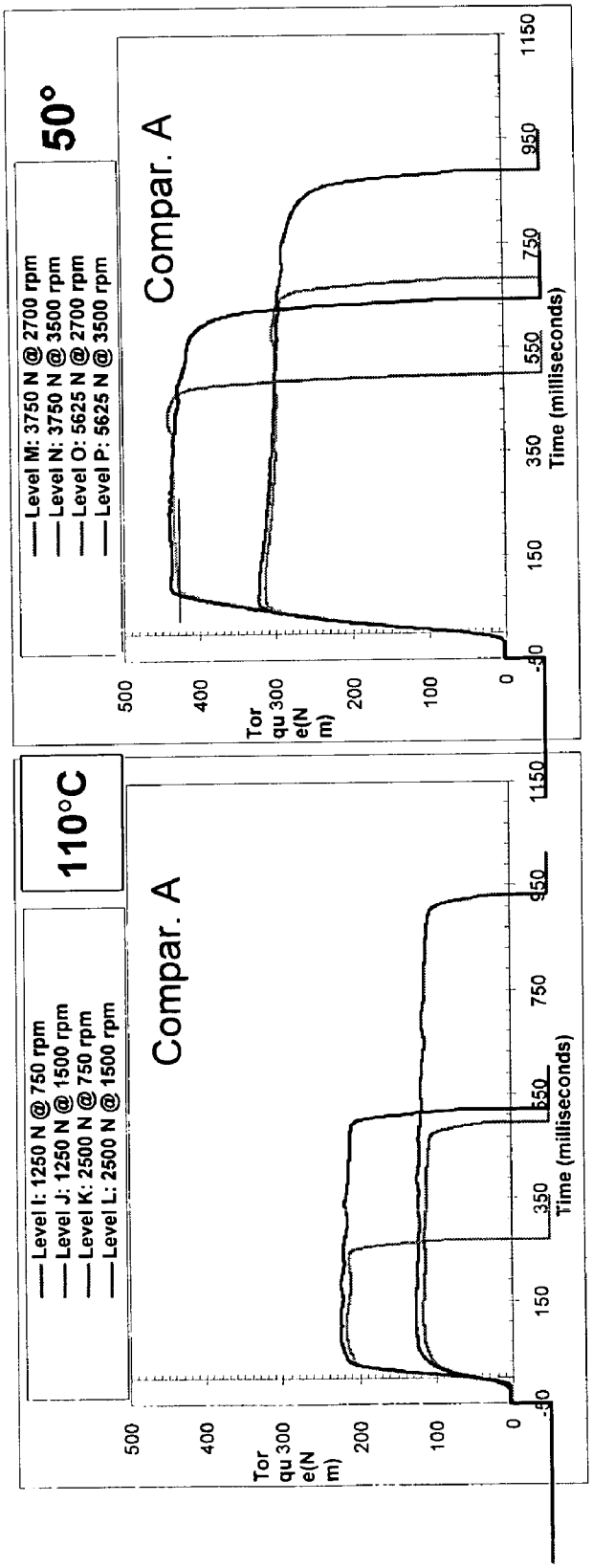

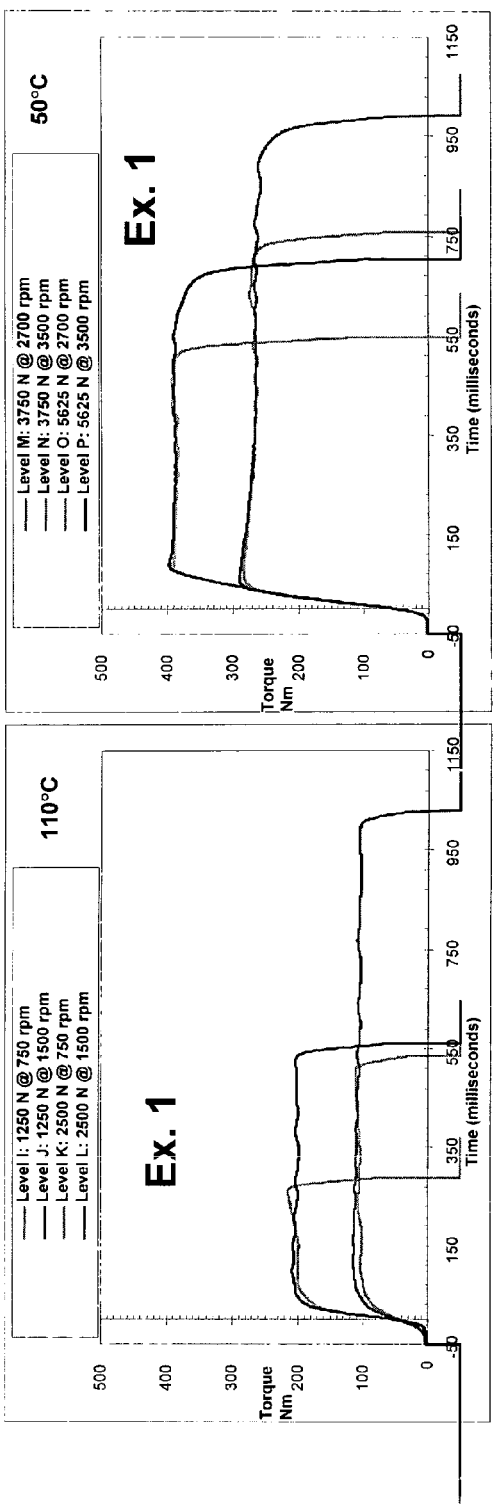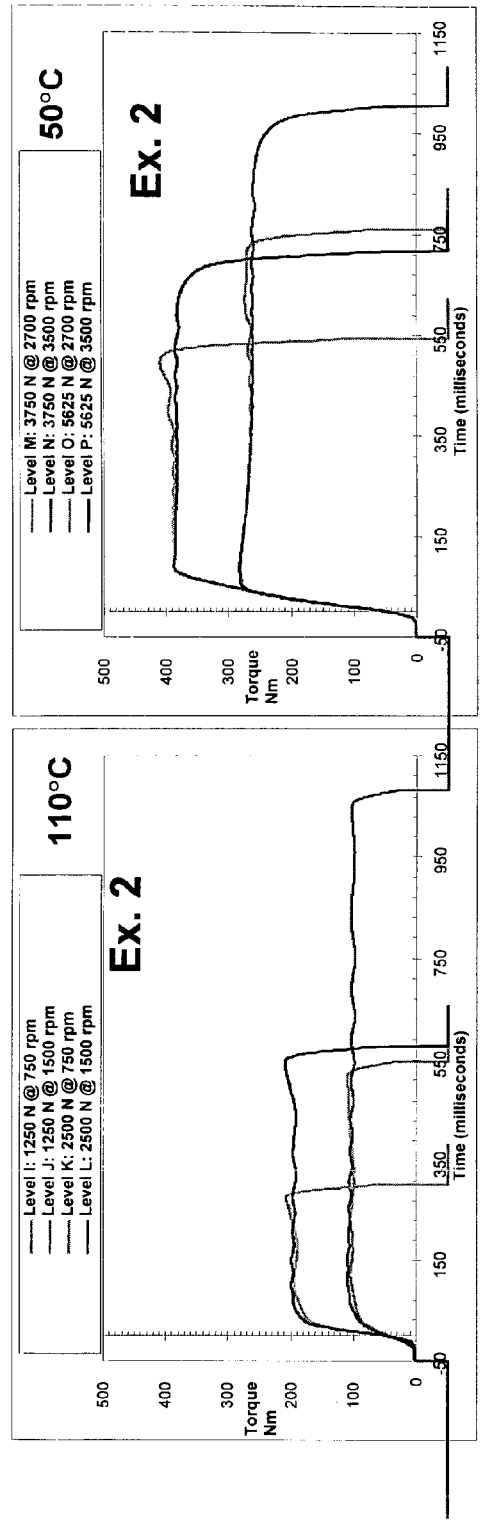
Fig. 3a  Fig. 3b  Fig. 4a  Fig. 4b

110°C

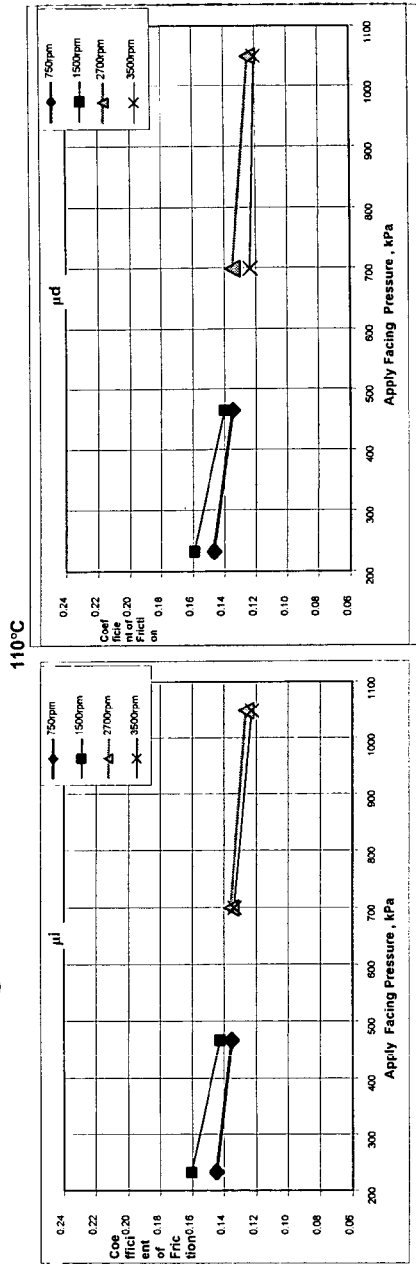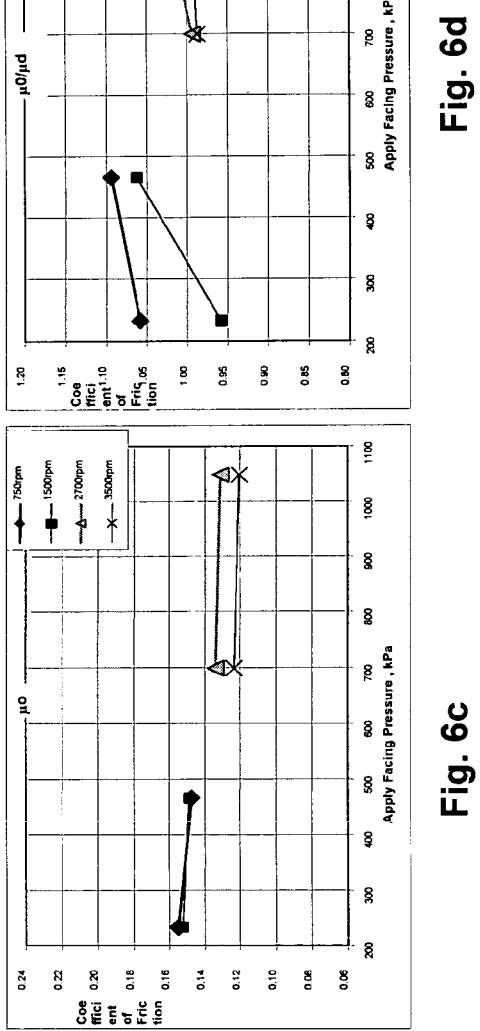
Fig. 6a
Fig. 6b
Fig. 6c
Fig. 6d

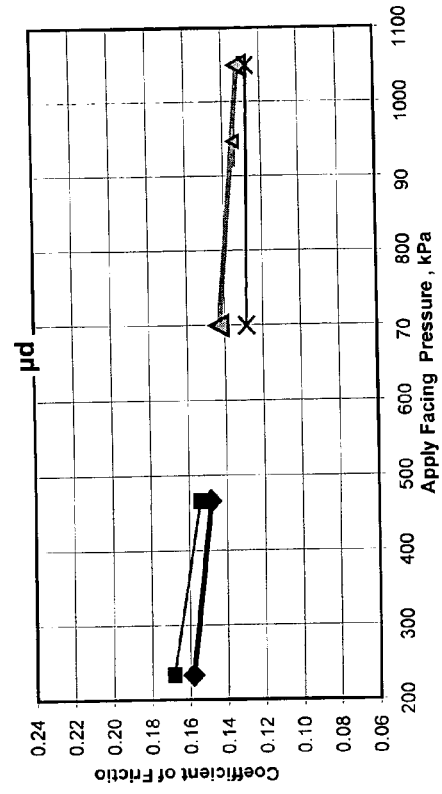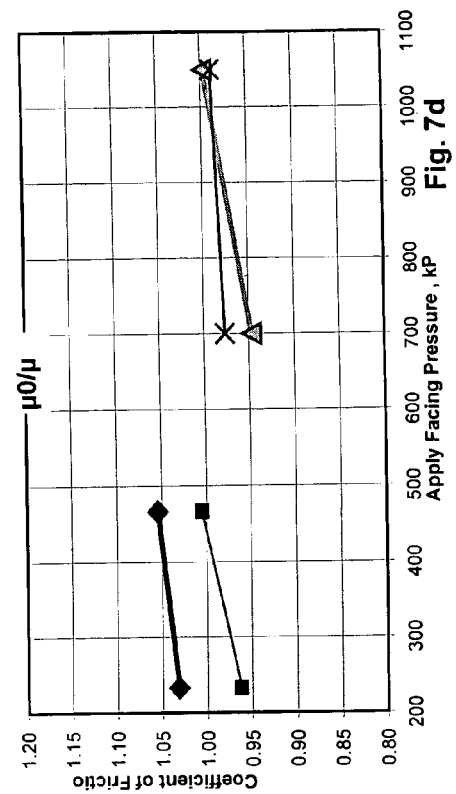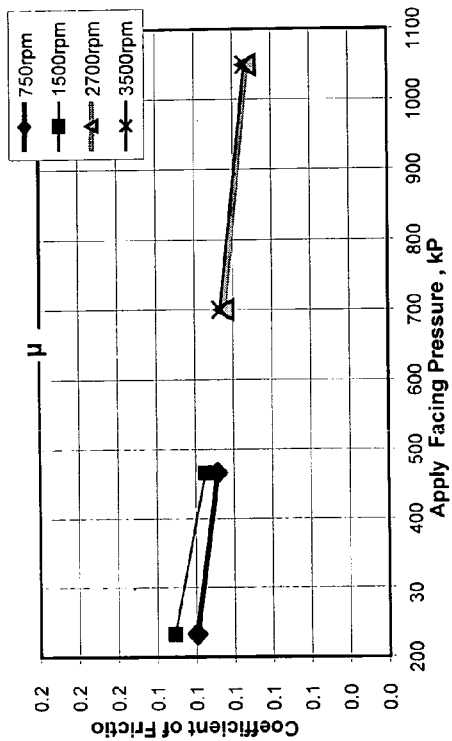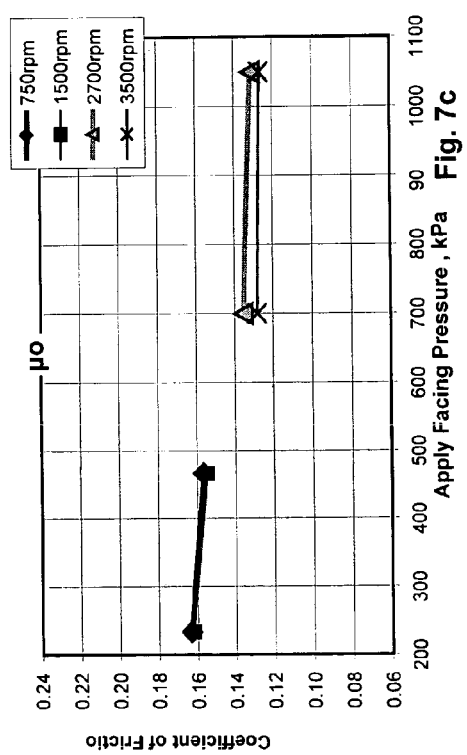
Fig. 7a
Fig. 7b
Fig. 7c
Fig. 7d

110°C

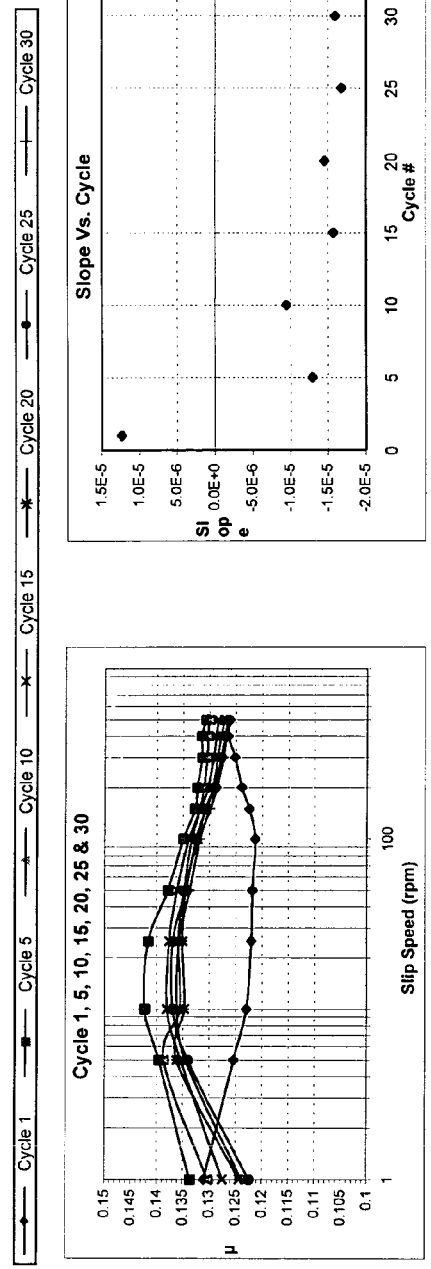
Fig. 14a
Fig. 14b
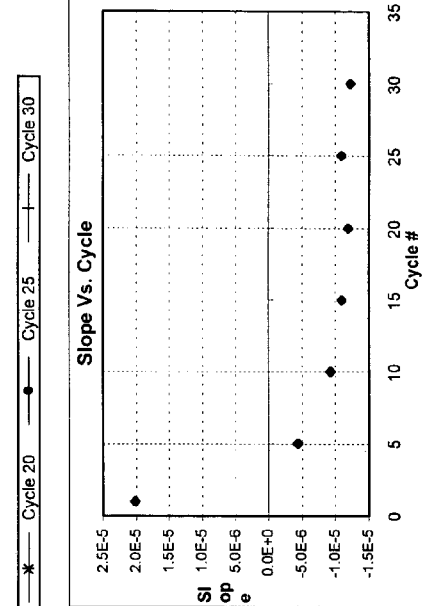
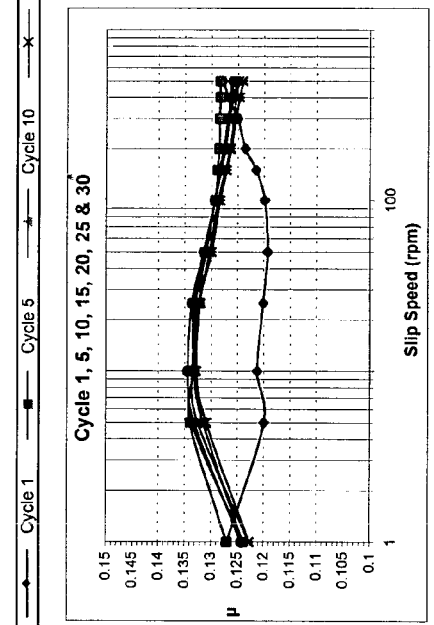
Fig. 15a
Fig. 15b

MIXED DEPOSIT FRICTION MATERIAL

BACKGROUND ART

New and advanced transmission systems and braking systems are being developed by the automotive industry. These new systems often involve high-energy requirements. Therefore, the friction materials technology must be also developed to meet the increasing energy requirements of these advanced systems.

In particular, a new high performance, durable friction material is needed. The new friction material must be able to withstand high speeds wherein surface speeds are up to about 65 m/seconds. Also, the friction material must be able to withstand high facing lining pressures up to about 1500 psi. It is also important that the friction material be useful under limited lubrication conditions.

The friction material must be durable and have high heat resistance in order to be useful in the advanced transmission and braking systems. Not only must the friction material remain stable at high temperatures, it must also be able to rapidly dissipate the high heat that is being generated during operating conditions.

The high speeds generated during engagement and disengagement of the new transmission and braking systems mean that a friction material must be able to maintain a relatively constant friction throughout the engagement. It is important that the frictional engagement be relatively constant over a wide range of speeds and temperatures in order to minimize "shuddering" of materials during braking or the transmission system during power shift from one gear to another. It is also important that the friction material have a desired torque curve shape so that during frictional engagement the friction material is noise or "squawk" free.

In particular, transmission and torque-on-demand systems incorporate slipping clutches mainly for the fuel efficiency and driving comfort. The role of the slip clutch within these systems varies from vehicle launching devices, such as wet start clutches, to that of a torque converter clutches. According to the operating conditions, the slip clutch can be differentiated into three principle classes: (1) Low Pressure and High Slip Speed Clutch, such as wet start clutch; (2) High Pressure and Low Slip Speed Clutch, such as Converter Clutch; and (3) Extreme Low Pressure and Low Slip Speed Clutch, such as neutral to idle clutch.

The principal performance concerns for all applications of the slip clutch are the prevention of shudder and the energy management of the friction interface. The occurrence of shudder can be attributed to many factors including the friction characteristics of the friction material, the mating surface's hardness and roughness, oil film retention, lubricant chemistry and interactions, clutch operating conditions, driveline assembly and hardware alignment, and driveline contamination. The friction interface energy management is primarily concerned with controlling interface temperature and is affected by the pump capacity, oil flow path and control strategy. The friction material surface design also contributes to the efficiency of interface energy management.

Previously, asbestos fibers were included in the friction material for temperature stability. Due to health and environmental problems, asbestos is no longer being used. More recent friction materials have attempted to overcome the absence of the asbestos in the friction material by modifying impregnating paper or fiber materials with phenolic or phenolic-modified resins. These friction materials, however, do not rapidly dissipate the high heat generated, and do not have the necessary heat resistance and satisfactory high coefficient of friction performance now needed for use in the high speed systems currently being developed.

The present invention is an improvement over the Seitz U.S. Pat. No. 5,083,650 reference which involves a multi-step impregnating and curing process; i.e., a paper impregnated with a coating composition, carbon particles are placed on the paper, the coating composition in the paper is partially cured, a second coating composition is applied to the partially cured paper, and finally, both coating compositions are cured.

The present invention is an improvement over the Smith et al. U.S. Pat. No. 5,965,659 which involves the use of carbonaceous fibers derived from oxidized polyacrylonitrile based fibers.

In other friction materials, metallic fibers combined with carbon materials were included in the friction material for wear resistance. For example, Fujimaki et al. U.S. Pat. No. 4,451,590 describes a friction material having metallic fibers, filler, carbon particles, carbon fibers and phenolic resin. However, the metallic based friction materials do not have sufficient porosity and compressibility to be capable of high fluid permeation capacity during use. Also, the metallic based friction materials are not sufficiently resilient or elastic, yet resistant to compression set to be capable of withstanding high facing lining pressures of up to about 1500 psi (approximately 105 kg/cm$^2$). The metallic based friction material also is not capable of withstanding high surface speeds of up to about 65 m/second which are generated during engagement and disengagement of the new transmission and braking systems.

The present invention is also an improvement over earlier co-owned patents by the assignee herein, BorgWarner Inc., for friction materials. In particular, U.S. Pat. No. 5,998,307 relates to a friction material having a base impregnated with a curable resin where a porous primarily layer comprises at least one fibrous material and a secondary layer of carbon particles covering at least about 3 to about 90% of the surface of the primary layer. The U.S. Pat. No. 5,858,883 relates to a base material having a primary layer of less fibrillated aramid fibers, synthetic graphite, and a filler, and a secondary layer of carbon particles on the surface of the primary layer. U.S. Pat. No. 5,856,244 relates to a friction material comprising a base impregnated with a curable resin where the primary layer comprises less fibrillated aramid fibers, synthetic graphite and filler; and a secondary layer of carbon particles and a retention aid. The U.S. Pat. No. 5,958,507 relates to a process for producing the friction material where at least one surface of the fibrous material which comprises less fibrillated aramid fibers is coated with carbon particles and a retention aid, impregnating with a phenolic or modified phenolic resin, and curing. The U.S. Pat. No. 6,001,750 relates to a friction material comprising a fibrous base material impregnated with a curable resin where the fibrous base material has a porous primary layer of less fibrillated aramid fibers, carbon particles, carbon fibers, filler material, phenolic novoloid fibers, and optionally, cotton fibers, and a secondary layer of carbon particles which cover the surface at about 3 to about 90% of the surface.

In addition, various base materials are described in commonly owned BorgWarner Inc. U.S. Pat. Nos. 5,753,356 and 5,707,905 which describe base materials comprising less fibrillated aramid fibers, synthetic graphite and filler. Another commonly owned patent, U.S. Pat. No. 6,130,176, relates to non-metallic fibrous base materials comprising less fibrillated aramid fibers, carbon fibers, carbon particles and filler.

Yet another commonly owned patent application, Ser. No. 09/707,274, now allowed, relates to a friction material having a porous primary layer and a secondary layer of silica particles covering about 3 to about 90% of the surface of the primary layer. In a preferred aspect, the friction modifying particles comprise at least one of silica particles, resin powders, carbon powder or particles and/or partially carbonized powder or particles and mixtures thereof.

In order for friction materials to be useful in "wet" applications, the friction material must have a wide variety of acceptable characteristics. The friction material must be resilient or elastic yet resistant to compression set, abrasion and stress; have high heat resistance and be able to dissipate heat quickly; and, have long lasting, stable and consistent frictional performance. If any of these characteristics are not met, optimum performance of the friction material is not achieved.

It is also important that a suitable impregnating resin be used with the fibrous base material in order to form a high-energy application friction material. The friction material must have good shear strength both when saturated with the wet resin during impregnation and when saturated with brake fluid or transmission oil during use.

It is also important, under certain applications, that the friction materials have high porosity such that there is a high fluid permeation capacity during use. Thus, it is important that the friction material not only be porous, it must also be compressible. The fluids permeated into the friction material must be capable of being squeezed or released from the friction material quickly under the pressures applied during operation of the brake or transmission, yet the friction material must not collapse. It is also important that the friction material have high thermal conductivity to also help rapidly dissipate the heat generated during operation of the brake or transmission.

As far as is known, there is no disclosure of friction material for use in transmission systems which includes a fibrous base material comprising a primary layer having deposited thereon at least a partial covering of a secondary layer of friction modifying particles that comprises a mixture of silica materials and carbon particles.

Accordingly, it is an object of the present invention to provide an improved friction material with reliable and improved properties compared to those of the prior art.

A further object of this invention is to provide friction materials with improved coefficient of friction characteristics, "compression modulus", "hot spot" resistance, high heat resistance, high friction stability and durability, porosity, strength, and elasticity.

As a result of extensive research in view of the need for a better friction material, a friction material with improved characteristics has been developed by the invention. The present wet friction material is useful in "wet"applications where the friction material is "wetted" or impregnated with a liquid such as brake fluid or automatic transmission fluid during use. During use of the "wet" friction material, the fluid is ultimately squeezed from or is impregnating the friction material. Wet friction materials differ greatly, both in their compositions and physical characteristics from "dry" friction materials.

DISCLOSURE OF THE INVENTION

In order to achieve the requirements discussed above, many materials were evaluated for friction and heat resistant characteristics under conditions similar to those encountered during operation. Both commercially available brake linings and transmission materials were investigated and proved not to be suitable for use in high-energy applications.

The present invention relates to a non-asbestos, fibrous base material comprising a primary layer and a secondary layer comprising friction modifying particles deposited on the primary layer.

The present invention is especially useful with a primary layer comprising a fibrous base material comprising aramid fibers alone and/or combinations of less fibrillated aramid fibers, cotton fibers, carbon fibers, carbon particles and at least one filler material and, optionally, other ingredients. In certain examples, the less fibrillated aramid fibers create a porous fibrous base material. The carbon fibers provide the friction material with good heat conduction such that the friction material has desired heat resistance. The carbon particles also provide the friction material with good friction characteristics such as a good or smooth "feel" in shift and essentially noise or "squawk" free operation of the brakes and clutches. The presence of a small relative amount of cotton fibers provides the friction material with desired "break-in" characteristics such that there is little or no shudder occurring during the initial use of the friction material.

The present invention is especially useful in brakes and in clutch applications. The present invention provides a fibrous vase material with an optimum amount of a mixture of carbonaceous material and friction modifying material deposited on at least one surface of the fibrous base material. In certain preferred embodiments, the mixture of such materials is deposited on the fibrous base material during the process of making the fibrous base material.

In one aspect, the present invention relates to a friction material having a primary layer comprising a fibrous base material comprising aramid fibers alone and/or combinations of at least one less fibrillated aramid fibers, cotton fibers, carbon fibers, carbon particles and at least one filler material and, optionally, other ingredients.

The mixture of carbonaceous material and friction modifying material provide the friction material with good heat conduction such that the friction material has desired heat resistance. The carbonaceous material in the mixture also provide the friction material with good friction characteristics such as a good or smooth "feel" in shift and essentially noise or "squawk" free operation of the brakes and clutches. In certain embodiments, the presence of a small relative amount of cotton fibers provides the friction material with desired "break-in" characteristics such that there is little or no shudder occurring during the initial use of the friction material.

The secondary, or top, layer of the carbonaceous material and friction modifying particles is deposited on the primary layer to form the fibrous base material. Various carbonaceous materials which are useful in the secondary layer include carbon particles, graphite, carbon fibers and the like. Various friction modifying particles useful in the secondary layer on the fibrous base material include celite, diatonic earth, elastomers, filler, silicon, celatom and the like. In particular, silica particles such as diatomaceous earth, celite, celatom, and/or silicon dioxide are especially useful. The surface friction modifying particles are present at about 0.2 to about 20%, by weight, and preferably about 2-10%, by weight, and most preferably about 3-5%, by weight, of the fibrous base material.

The friction material of the present invention has improved "hot spot" resistance, desirable friction characteristics for "smooth shifts", high heat resistance durability, elasticity, improved strength and porosity.

Various friction modifying particles are useful as the secondary layer on the fibrous base material. In particular, silica particles such as diatomaceous earth, celite, celatom, and/or silicon dioxide are especially useful. The surface friction modifying particles are present at about 0.2 to about 30%, by weight, and preferably about 2-10%, by weight, and most preferably about 3-5%, by weight, of the fibrous base material.

Another type of particularly suitable friction modifying material useful in the secondary layer is a porous carbon material. In certain embodiments, carbon particles are particularly useful. Also, in one particular embodiment, the secondary layer comprises a mixture of silicon particles and carbon particles deposited on the surface of the primary layer in a preferred ratio. In certain embodiments, the secondary layer comprises about 20% to about 35%, by weight, of silica particles, and about 65% to about 80% carbon particles, based on the total weight of the friction modifying particles.

Thus, in certain aspects the present invention relates to a friction material comprising a fibrous base material impregnated with at least one curable resin where the fibrous base material comprises a high fiber content porous primary layer and the secondary layer comprises friction modifying particles on at least one surface of the primary layer. In certain embodiments, the secondary layer comprises about 5% to about 15%, by weight, of friction modifying particles, based on the weight of the fibrous base material.

Another aspect of the present invention relates to a process for producing a friction material comprising: forming a high fiber content fibrous base material; coating about 3% to about 30% of at least one surface of the fibrous base material with friction modifying particles comprising a mixture of carbon particles and silica particles, the friction modifying particles being present at about 0.2 to about 20%, by weight, based on the weight of the fibrous base material; impregnating the coated fibrous base material with a phenolic resin, phenolic-based or a phenolic-silicone resin mixture; and thereafter curing the impregnated fibrous base material at a predetermined temperature for a predetermined period of time.

The fibrous base material can be impregnated using different resin systems. In certain embodiments, it is useful to impregnate the fibrous based material with a phenolic resin or a modified phenolic-based resin. In certain embodiments, when a silicone resin is blended or mixed with a phenolic resin in compatible solvents and that silicone-phenolic resin blend is used to impregnate a fibrous base material of the present invention, an especially useful high performance, durable friction material is formed.

BRIEF DESCRIPTION OF DRAWINGS

FIGS. 1a and 1b the torque curves (μPVT) for Comparative example A at various levels and speed at 110° C. (FIG. 1a) and at 50° C. (FIG. 1b).

(FIG. 2a) and at 50° C. (FIG. 2b).

FIGS. 3a and 3b the torque curves (μPVT) for Example 1 at various levels and speed at 110° C. (FIG. 3a) and at 50° C. (FIG. 3b).

FIGS. 4a and 4b the torque curves (μPVT) for Example 2 at various levels and speed at 110° C. (FIG. 4a) and at 50° C. (FIG. 4b).

FIGS. 6a-6d are graphs comparing the initial ($\mu i$) (FIG. 6a), dynamic ($\mu d$) (FIGS. 6b), and final ($\mu 0$) (FIG. 6c) coefficients of friction and the ratio of final/dynamic ($\mu 0$)/($\mu d$) (FIG. 6d) coefficient of friction to the apply facing pressure, kPA, for Comparative Ex. B.

FIGS. 7a-7d are graphs comparing the initial ($\mu i$) (FIG. 7a), dynamic ($\mu d$) (FIGS. 7b), and final ($\mu 0$) (FIG. 7c) coefficients of friction and the ratio of final/dynamic ($\mu 0$)/($\mu d$) (FIG. 7d) coefficient of friction to the apply facing pressure, kPA, for Example 1.

FIG. 14a is a graph showing the μ-V durability relationship (constant speed method) for Example 1 showing the cycles at 1, 5, 10, 15, 20, 25 and 30 by comparing the coefficient of friction ($\mu$) to the slip speed (rpm).

FIG. 14b is a graph showing the slope vs. cycle for the Example 1.

FIG. 15a is a graph showing the μ-V durability relationship (constant speed method) for Example 2 showing the cycles at 1, 5, 10, 15, 20, 25 and 30 by comparing the coefficient of friction ($\mu$) to the slip speed (rpm).

FIG. 15b is a graph showing the slope vs. cycle for the Example 2.

BEST MODE OF CARRYING OUT THE INVENTION

Figures 2A, 2B:
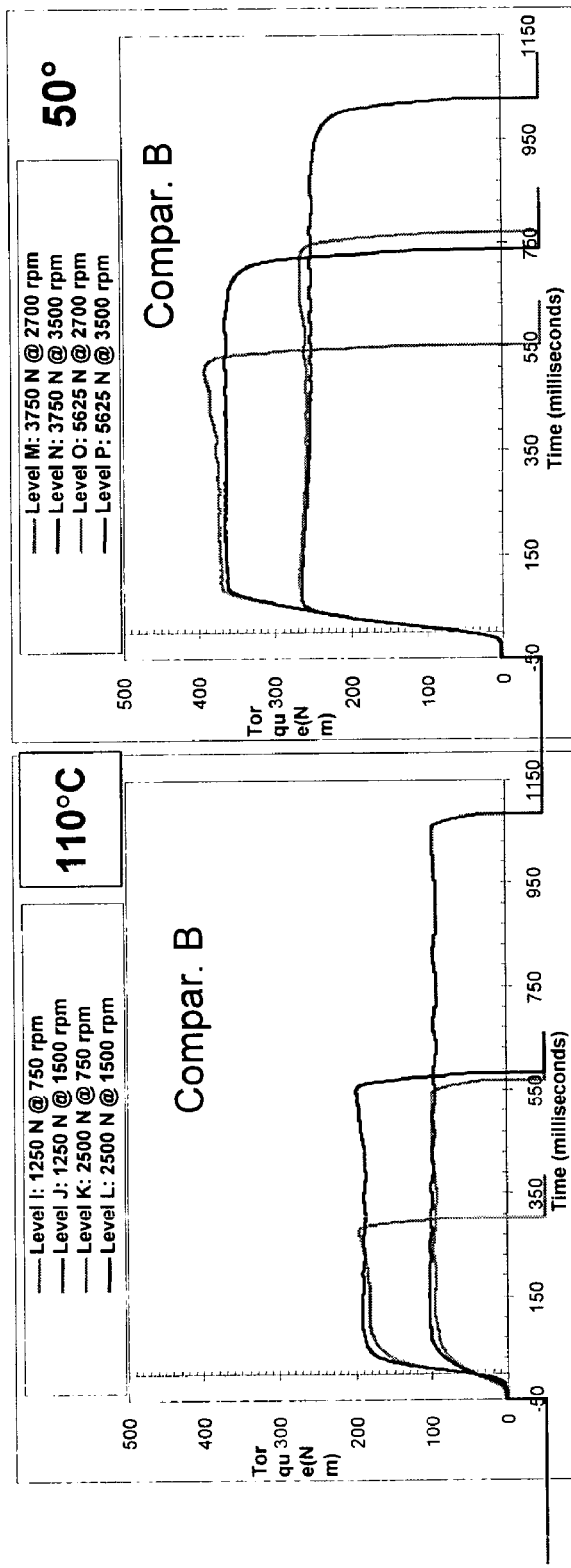
FIGS. 2a and 2b the torque curves (μPVT) for Comparative example B at various levels and speed at 110° C.
Figure 5A:
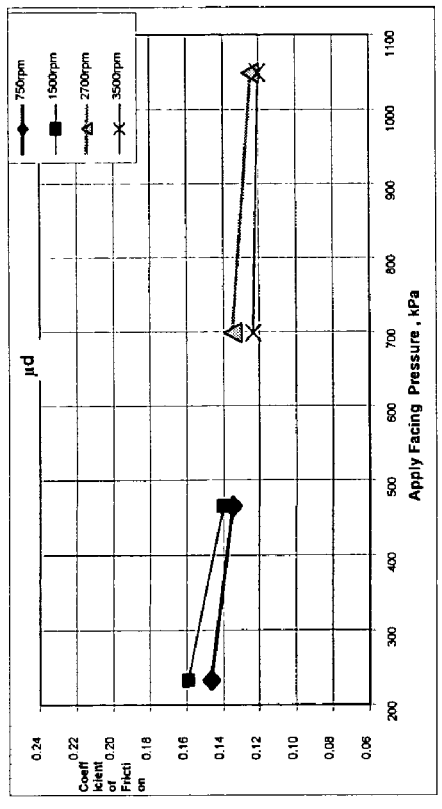
FIGS. 5a-5d are graphs comparing the initial ($\mu i$) (FIG. 5a), dynamic ($\mu d$) (FIGS. 5b), and final ($\mu 0$) (FIG. 5c) coefficients of friction and the ratio of final/dynamic ($\mu 0$)/($\mu d$) (FIG. 5d) coefficient of friction to the apply facing pressure, kPA, for Comparative Ex. A.
Figure 5B:
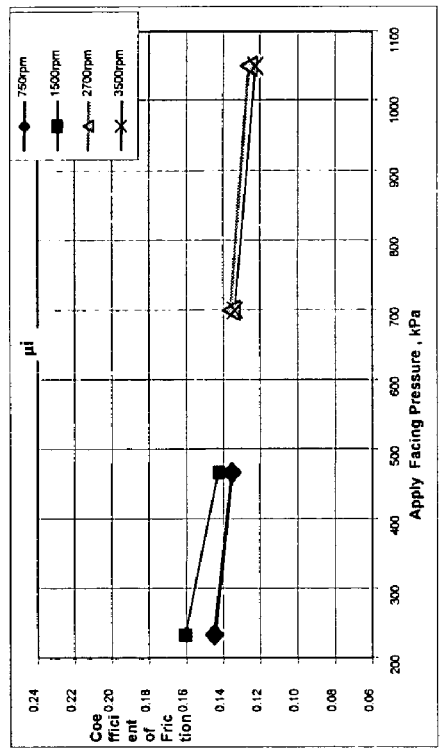
Figure 5C:
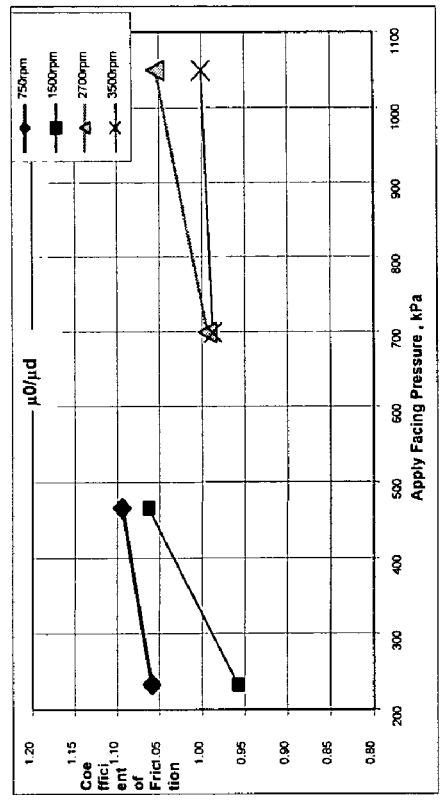
Figure 5D:
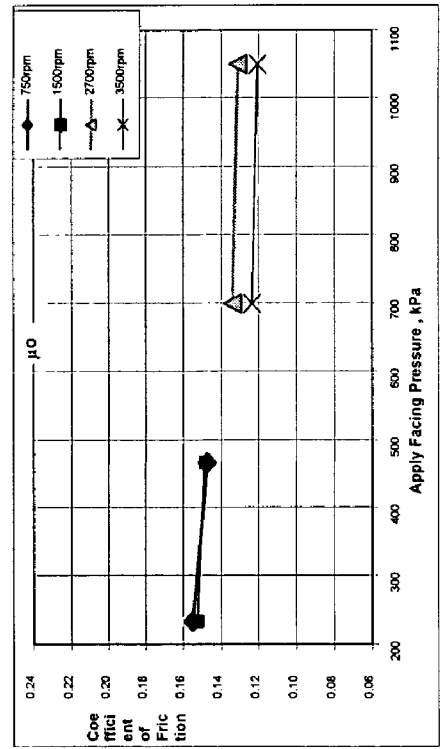
Figure 8A:
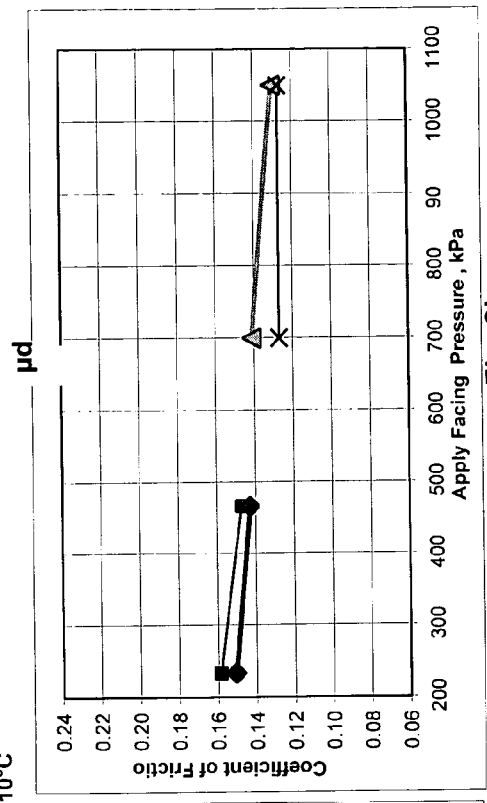
FIGS. 8a-8d are graphs comparing the initial ($\mu i$) (FIG. 8a), dynamic ($\mu d$) (FIGS. 8b), and final ($\mu 0$) (FIG. 8c) coefficients of friction and the ratio of final/dynamic ($\mu 0$)/($\mu d$) (FIG. 8d) coefficient of friction to the apply facing pressure, kPA, for Example 2.
Figure 8C:
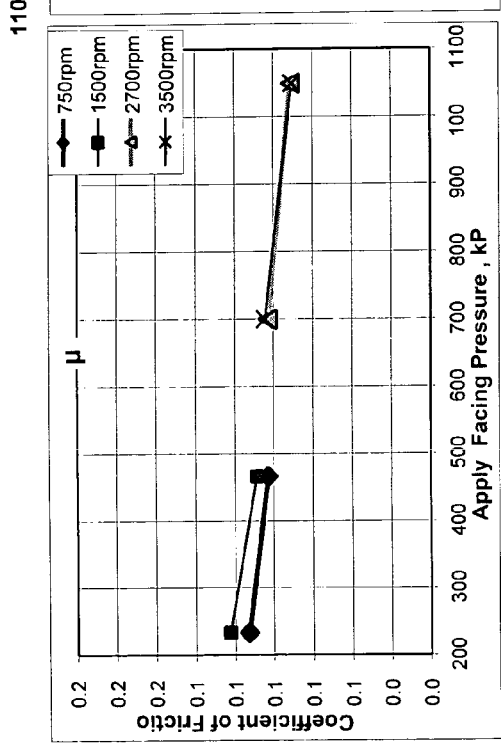
Figure 8B:
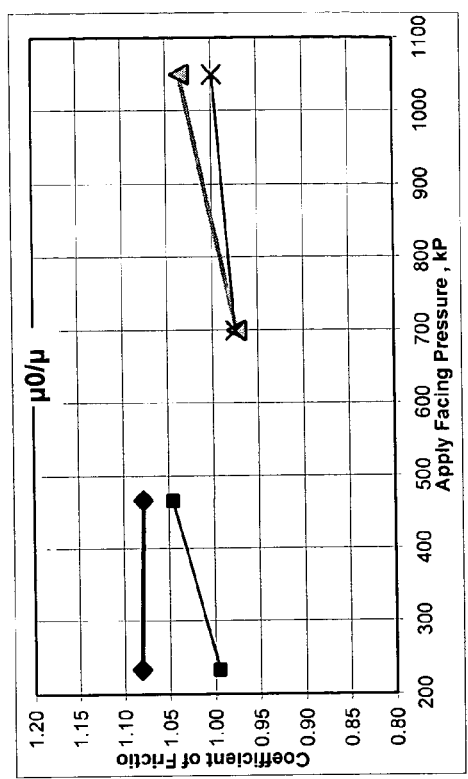
Figure 8D:
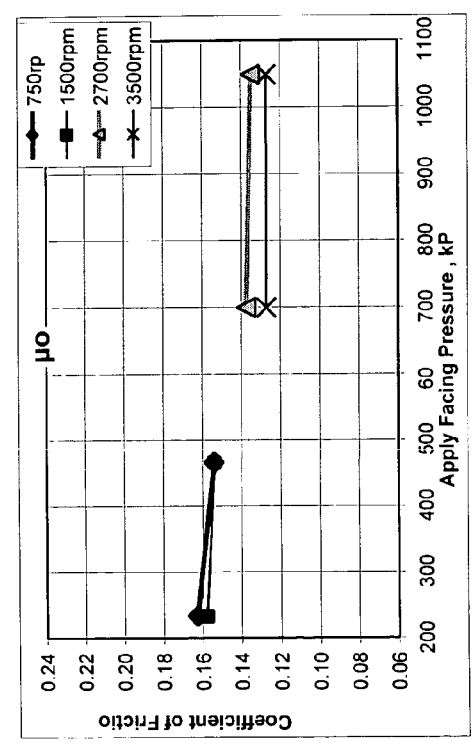

The friction material of the present invention has improved coefficient of friction characteristics and high thermal stability. The friction material of the present invention also has desirable compression modulus and desirable durability. Also, the friction material has improved elasticity and improved porosity which allow for more uniform heat dissipation during use of the friction material. The fluid in the transmission or brake can rapidly move through the porous structure of the friction material. Further, the increased elasticity provides more uniform pressure or even pressure distribution on the friction material such that uneven lining wear, and separator plate "hot spots" are eliminated.

The more porous the structure of the friction material, the more efficient is the heat dissipation. The oil flow in and out of the friction material during engagement of the friction material during use occurs more rapidly when the friction material is porous.

The present invention relates to a non-asbestos, fibrous base material comprising a primary layer and a secondary layer comprising a mixture of friction modifying particles deposited on the primary layer.

In one particular embodiment, the primary layer comprises fibers and filler material. Also, in certain embodiments, it is useful to have less fibrillated aramid fibers in the fibrous base material to provide a desirable pore structure to the friction material which, in turn, provides increased thermal resistance to the friction material. The fiber geometry not only provides increased thermal resistance, but also provides delamination resistance and squeal or noise resistance. In certain embodiments, the presence of the carbon fibers in the primary layer aids in increasing the thermal resistance, maintaining a steady coefficient of friction and increasing the squeal resistance.

In particular embodiments, the fibrous base material has from about 10 to about 20%, and in certain embodiments about 15%, by weight, aramid fibers, when combined with a relatively high level, about 80 to about 90%, by wt, of cotton or other cellulose type fibers.

In other particular embodiments, the fibrous base material has from about 50 to about 60%, and in certain embodiments about 55%, by weight, aramid fibers, when combined with about carbon fibers 40 to about 50%, by wt.

When carbon fibers are used in the fibrous base material to provide good heat conduction such that the friction material has a desired heat resistance. In particular embodiments, the fibrous base material has from about 5 to about 20%, and in certain embodiments, about 10 to about 15%, by weight, carbon fibers.

In other particular embodiments, the use of less fibrillated aramid fibers and carbon fibers in a fibrous base material improves the friction material's ability to withstand high temperatures. Less fibrillated aramid fibers generally have few fibrils attached to a core fiber. The use of the less fibrillated aramid fibers provides a friction material having a more porous structure; i.e., there are more and larger pores than if a typical fibrillated aramid fiber is used. The porous structure is generally defined by the pore size and liquid permeability. In a preferred embodiment, the fibrous base material defines pores ranging in mean average size from about 2.0 to about 25 microns in diameter. In certain embodiments, the mean pore size ranges from about 2.5 to about 8 microns in diameter and the friction material had readily available air voids of at least about 50% and, in certain embodiments, at least about 60% or higher.

When the friction material has a higher mean flow pore diameter and permeability, the friction material is more likely to run cooler or with less heat generated in a transmission due to better automatic transmission fluid flow throughout the porous structure of the friction material. During operation of a transmission system, oil deposits on the surface of the friction material tend to develop over time due to a breakdown of the automatic transmission fluid, especially at high temperatures. The oil deposits on the fibers decrease the pore openings. Therefore, when the friction material initially starts with larger pores, there are more open pores remaining during the useful life of the friction material. In addition, in embodiments at least partially impregnated with a silicone resin, the silicone resin, due its elastic characteristics, allows the fibers in the friction material to have an even more open structure.

Also, in certain embodiments, it is desired that the aramid fibers have a length ranging from about 0.5 to about 10 mm and a Canadian Standard Freeness (CSF) of greater than about 300. Thus, in certain embodiments, the aramid fibers can have a freeness of about 350 to about 650 on the Canadian Standard Freeness index. In certain other embodiments, it is desired to use less fibrillated aramid fibers which have a CSF of about 450 to about 550 preferably about 530 and greater; and, in other certain embodiments, about 580-650 and above and preferably about 650 and above. In contrast, more fibrillated fibers, such as aramid pulp, have a freeness of about 285-290.

The "Canadian Standard Freeness" (T227 om-85) means that the degree of fibrillation of fibers can be described as the measurement of freeness of the fibers. The CSF test is an empirical procedure which gives an arbitrary measure of the rate at which a suspension of three grams of fibers in one liter of water may be drained. Therefore, the less fibrillated aramid fibers have higher freeness or higher rate of drainage of fluid from the friction material than other aramid fibers or pulp. Friction materials comprising the aramid fibers having a CSF ranging from about 430-650 (and in certain embodiments preferably about 580-640, or preferably about 620-640), provide superior friction performance and have better material properties than friction materials containing conventionally more fibrillated aramid fibers. The longer fiber length, together with the high Canadian freeness, provide a friction material with high strength, high porosity and good wear resistance. The less fibrillated aramid fibers (CSF about 530-about 650) have especially good long-term durability and stable coefficients of friction.

Still other embodiments that are within the contemplated scope of the present invention, include synthetic graphite in the fibrous base material to provide a more three dimensional structure to the fibrous base material than other types of graphite material. The synthetic graphite is made by graphitization of a raw stock material such as petroleum coke and a coal tar pitch binder. The raw materials are mixed and heated to temperatures of about 2,8000° to about 3,000° C. in special graphitizing furnaces which convert the baked carbon body into a polycrystalline graphite article. The synthetic graphite (which has high thermal conductivity) provides the friction material with the ability to dissipate heat more rapidly than other types of graphite. In certain embodiments, it is preferred that the size and geometry of the synthetic graphite be in the about 20 to about 50 micron size range. In these certain embodiments, it has been discovered that if the graphite particle size is too large or too small, there is not the optimum three-dimensional structure and consequently the heat resistance is not as optimum. In particular embodiments, about 20 to about 40%, by weight, graphite is included in the fibrous base formulation Small amounts of at least one type of filler material are also useful in the primary layer of the fibrous base material of the present invention. For example, silica fillers, such as diatomaceous earth, are useful. However, it is contemplated that other types of fillers are suitable for use in the present invention and that the choice filler depends on the particular requirements of the friction material. In particular, relatively small amounts, preferably ranging from about 3 to about 15%, by weight, of filler material, is now found to provide an especially useful primary layer.

In certain embodiments where carbon fibers are present in the primary layer, it is preferred that there is no cotton fiber content. In other embodiments with no carbon fiber content, a relatively high amount of cotton fibers, such as about 40-50%, by weight, in the primary layer of the fibrous base material improves the friction material's clutch "break-in" characteristics at an economical cost. In such embodiments, cotton fiber is added to the fibrous base material of the present invention to give the fibrous material higher coefficients of friction. In certain embodiments, about 40 to about 50%, and, in certain embodiments, about 45% cotton can also be added to the fibrous base material.

At least one type of latex type material can be included in the fibrous base material. In particular embodiments, the fibrous base material can have from about 0 to about 3%, and in certain embodiments, about 2%, by weight, latex type material.

One example of a formulation for the primary layer of a fibrous base material comprises about 40 to about 60%, by weight, less fibrillated aramid fiber; about 5 to about 20%, by weight, carbon fibers; about 10 to about 20% cotton fibers; about 3 to about 15% carbon particles, about 3 to about 15%, by weight, filler material; and about 0 to about 3%, by weight, latex type material.

Another example of a formulation for the primary layer of the high fiber content fibrous base material comprises about 50 to about 60%, by weight, aramid fibers; about 40 to about 10%, by weight, cotton fibers; about 5-15%, by weight, carbon fibers; about 20 to about 30%, by weight, graphite particles; and, about 5 to about 15%, by weight, filler material.

Still another example of a formulation for the primary layer of the high fiber content fibrous base material comprises about 50 to about 60%, by weight, aramid fibers, about to about 15%, by weight, carbon fibers; about 20 to about 30 %, by weight, graphite; and about 5 to about 15%, by weight, silica filler material.

Various fillers are also useful in the primary layer of the fibrous base material of the present invention. In particular, silica fillers, such as diatomaceous earth, are useful. However, it is contemplated that other types of fillers are suitable for use in the present invention and that the choice filler depends on the particular requirements of the friction material.

In certain embodiments, cotton fiber is added to the fibrous base material of the present invention to give the fibrous material higher coefficients of friction. In certain embodiments, about 5 to about 20%, and, in certain embodiments, about 10% cotton can also be added to the fibrous base material.

One example of a formulation for the primary layer of a fibrous base material, as described in the above incorporated by reference U.S. Pat. No. 6,130,176, comprises about 10 to about 50%, by weight, of a less fibrillated aramid fiber; about 10 to about 35%, by weight, of activated carbon particles; about 5 to about 20%, by weight, cotton fibers, about 2 to about 15%, by weight, carbon fibers; and, about 10 to about 35%, by weight, of a filler material. In certain embodiments, one particular formulation has found to be useful comprises about 35 to about 45%, by weight, less fibrillated aramid fibers: about 10 to about 20%, by weight, activated carbon particles; about 5 to about 15% cotton fibers; about 2 to about 10%, by weight, carbon fibers; and, about 25 to about 35%, by weight, filler.

A secondary layer comprising a mixture of carbonaceous material and friction modifying particles is deposited on the primary layer to form the fibrous base material. The use of a mixture of friction modifying particles as a secondary layer on the primary layer of the fibrous base material provides high heat resistant and highly durable fibrous base material.

The use of mixture of the carbonaceous material and friction modifying material on the primary layer of the fibrous base material also provides a three dimensional structure to the fibrous base material.

It has surprisingly been found that a combination of silica particles and carbon particles, when present in preferred ratios, as a secondary layer of a fibrous base material, is particularly useful.

In certain embodiments, useful friction modifying particles include a desired mixture of silica particles and partially and/or fully carbonized carbon particles. For example, the secondary layer can comprise a mixture of i) diatomaceous earth particles and ii) fully carbonized carbon particles or partially carbonized particles, and mixtures thereof.

In certain embodiments, the secondary layer mixture comprises silica particles and carbon particles in a ratio of about 4 parts silica particles to about 1part carbon particles. In other embodiments, the ratio is about 2 parts silica particles to about 1 part carbon particles. For example, silica particles such as diatomaceous earth, Celite®, Celatom®, and/or silicon dioxide are especially useful. The silica particles are inexpensive organic materials which bond strongly to the fibrous materials. The silica particles provide high coefficients of friction to the friction material. The silica particles also provide the friction material with a smooth friction surface and provides a good "shift feel" and friction characteristics to the friction material such that any "shudder" is minimized. The carbon particles, while being relatively expensive, provide especially beneficial hot spot resistance and high friction stability and durability to the friction material.

The uniformity of the secondary layer of the mixture of carbonaceous material and friction modifying particles on the surface of fibrous base materials is achieved by using a range and size of the particles that is preferably from about 0.5 to about 80 microns, and preferably about 0.5 to about 20 microns. In these certain embodiments, it has been discovered that if the friction modifying particle size is too large or too small, the optimum three-dimensional structure not achieved and, consequently, the heat dissipation is not as optimum.

In preferred embodiments, the amount of mixture of carbonaceous material and friction modifying particles on the primary layer ranges from about 0.2 to about 20%, by weight, and in certain embodiments about 2 to about to about 15%, by weight, and in certain preferred embodiments about 2 to about 5%, by weight, of the friction paper. In preferred embodiments, the area of coverage of the mixture on the primary layer surface is in the range of the about 3 to about 90% of the surface area.

A preferred process for producing the friction material comprises mixing the ingredients forming the primary layers of the fibrous base material. At least one surface of the primary layer of the fibrous base material is coated with the secondary layer of the mixture of carbonaceous material and friction modifying particles. The fibrous base material with the mixture coated thereon is then impregnated with at least one phenolic or phenolic-based resin. The impregnated, coated fibrous base material is cured at a predetermined temperature for a predetermined period of time to form the friction material.

Various methods for impregnating the friction materials of the present invention can be used. The fibrous base material is impregnated with the phenolic or phenolic based resin, preferably so that the impregnating resin material comprises about 45 to about 65 parts, by weight, per 100 parts, by weight, of the friction material. After the fibrous base material has been impregnated with the resin, the impregnated fibrous base material is heated to a desired temperature for a predetermined length of time to form the friction material. The heating cures the phenolic resin at a temperature of about 300° F. When other resins are present, such as a silicone resin, the heating cures the silicone resin at a temperature of about 400° F. Thereafter, the impregnated and cured friction material is adhered to the desired substrate by suitable means.

Various resins useful in impregnating the fibrous base material include phenolic resins and phenolic-based resins. It is to be understood that various phenolic-based resins which include in the resin blend other modifying ingredients, such as epoxy, butadiene, silicone, tung oil, benzene, cashew nut oil and the like, are contemplated as being useful with the present invention. In the phenolic-modified resins, the phenolic resin is generally present at about 50% or greater by weight (excluding any solvents present) of the resin blend. However, it has been found that friction materials, in certain embodiments, can be improved when the impregnant resin blend contains about 5 to about 80%, by weight, and for certain purposes, about 15 to about 55%, and in certain embodiments about 15 to about 25%, by weight, of silicone resin based on the weight of the silicone-phenolic mixture (excluding solvents and other processing acids).

Examples of useful phenolic and phenolic-silicone resins useful in the present invention are disclosed in the above-referenced BorgWarner U.S. patents which are fully incorporated herein, by reference. Silicone resins useful in the present invention include, for example, thermal curing silicone sealants and silicone rubbers. Various silicone resins are useful with the present invention. One resin, in particular, comprises xylene and acetylacetone (2,4-pentanedione). The silicone resin has a boiling point of about 362° F. (183° C.), vapor pressure at 68° F. mm, Hg: 21, vapor density (air=1) of 4.8, negligible solubility in water, specific gravity of about 1.09, percent volatile, by weight, 5% evaporation rate (ether=1), less than 0.1, flash point about 149° F. (65° C.) using the Pensky-Martens method. It is to be understood that other silicone resins can be utilized with the present invention. Other useful resin blends include, for example, a suitable phenolic resin comprises (% by wt.): about 55 to about 60% phenolic resin; about 20 to about 25% ethyl alcohol; about 10 to about 14% phenol; about 3 to about 4% methyl alcohol; about 0.3 to about 0.8% formaldehyde; and, about 10 to about 20% water. Another suitable phenolic-based resin comprises (% by wt.): about 50 to about 55% phenol/formaldehyde resin; about 0.5% formaldehyde; about 11% phenol; about 30 to about 35% isopropanol; and, about 1 to about 5% water.

It has also been found that another useful resin is an epoxy modified phenolic resin which contains about 5 to about 25 percent, by weight, and preferably about 10 to about 15 percent, by weight, of an epoxy compound with the remainder (excluding solvents and other processing aids) phenolic resin. The epoxy-phenolic resin compound provides, in certain embodiments, higher heat resistance to the friction material than the phenolic resin alone.

In certain embodiments, it is preferred that the target pick up of resin by the fibrous base material range from about 35 to about 65%, and, in certain embodiments, about 60 to at least 65%, by weight, total silicone-phenolic resin. After the fibrous base material is impregnated with the resin, the fibrous base material is cured for a period of time (in certain embodiments for about ½ hour) at temperatures ranging between 300-400° C. to cure the resin binder and form the friction material. The final thickness of the friction material depends on the initial thickness of the fibrous base material and, in certain embodiments, preferably ranges from about 0.014" to about 0.040".

It further contemplated that other ingredients and processing aids known to be useful in both preparing resin blends and in preparing impregnating fibrous-based materials can be included in the friction materials.

Both the silicone resin and the phenolic resin are present in solvents which are compatible to each other. These resins are mixed together (in preferred embodiments) to form a homogeneous blend and then used to impregnate a fibrous base material. There is not the same effect if a fibrous base material is impregnated with a phenolic resin and then a silicone resin is added thereafter or vice versa. There is also a difference between a mixture of a silicone-phenolic resin solution, and emulsions of silicone resin powder and/or phenolic resin powder. When silicone resins and phenolic resins are in solution they are not cured at all. In contrast, the powder particles of silicone resins and phenolic resins are partially cured. The partial cure of the silicone resins and the phenolic resins inhibits a good impregnation of the fibrous base material.

In certain embodiments of the present invention, the fibrous base material is impregnated with a blend of a silicone resin in a solvent which is compatible with the phenolic resin and its solvent. In one embodiment, isopropanol has been found to be an especially suitable solvent. It is to be understood, however, that various other suitable solvents, such as ethanol, methyl-ethyl ketone, butanol, isopropanol, toluene and the like, can be utilized in the practice of this invention. The presence of a silicone resin, when blended with a phenolic resin and used to impregnate a fibrous base material, causes the resulting friction materials to be more elastic than fibrous base materials impregnated only with a phenolic resin. When pressures are applied to the silicone-phenolic resin blended impregnated friction material of the present invention, there is a more even distribution of pressure which, in turn, reduces the likelihood of uneven lining wear. After the silicone resin and phenolic resin are mixed together, the mixture is used to impregnate a fibrous base material.

Figure 16:
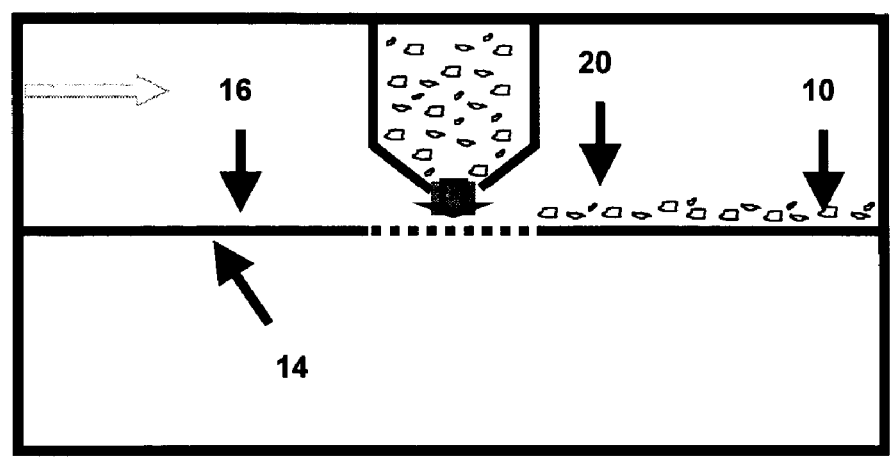
FIG. 16 is a schematic illustration of a process for making a high fiber content fibrous base material and a friction material therewith.

One preferred embodiment for making a friction material 10 of the present invention is shown in FIG. 16. A fibrous base material 12 comprises a lower layer 14 having an upper or top surface 16 and a lower or bottom surface 18. While the lower layer 14 is wet, friction modifying particles 20 are deposited onto the top surface 16 of the wet lower layer 14.

In certain methods it is also useful to use vacuum pressure (not shown) on the lower surface 18 of the wet layer 14 prior to deposition of the friction modifying particles 20 on the top surface 16 of the layer 14.

It has been found that the secondary layer of the mixture of carbonaceous material and friction modifying particles on the primary layer of the fibrous base material provides a friction material with good anti-shudder characteristics, high durability, good wear resistance and improved break-in characteristics.

EXAMPLES

Slip Clutch Interface Technology Requirements: The friction materials of the present invention are designed for slipping clutch applications that meet special requirements. These requirements include high mechanical strength, heat resistance, durability, stability, and shudder resistance. The friction material of the present invention has high porosity, a unique material structure for high mechanical strength, high temperature conductivity, and anti-shudder friction modifier characteristics. These material characteristics are the necessary conditions of smooth slip torque output and long term friction stability.

The slip clutch material requirements for desirable slip torque response and long-term durability include good curve shape and long term friction stability. The good curve shape is dependent on high material porosity and high friction modifier content. The long term friction stability is dependent on high porosity (anti-glazing) and high temperature ingredients.

The fibrous base material structure contains a porous and high temperature synthetic fiber network to provide high heat dissipation and friction stability. Friction modifying particles are deposited on the fibrous base material to provide the "anti-shudder" properties.

The following examples provide further evidence that the friction modifying particle coated fibrous base material and the resulting friction material of the present invention are an improvement over conventional friction materials. Various preferred embodiments of the invention are described in the following examples, which however, are not intended to limit the scope of the invention.

Example I

The torque curve shape indicates that the friction material of the present invention is especially useful in speed, high energy and high temperature application. The stable torque curve also shows that the friction material is noise free.

Table 1 shows the formulations for comparative examples A and B, and Examples 1 and 2. Table I also shows the basis weight, caliper, porosity, dry and wet tensile and ash properties for the examples shown. The new materials comprise a primary layer having an optimal amount of carbon fiber and a secondary layer comprises a mixture of carbon and celite and, optionally, a retention aid such as latex. In the secondary layer, in preferred embodiments, the ratio of carbon particles to silica ranges from about 1 to 4 to about 1 to 2.

TABLE I

| Furnish % | Example 1 | Example 2 | Compar. Example A | Compar. Example B |
|---|---|---|---|---|
| Primary Layer | | | | |
| Aramid fiber | 55 | 55 | 20-25 | 40-60 |
| Carbon 9 μm | 15 | 15 | | 10-20 |
| Cotton | | | 25-35 | |
| Graphite | 25 | 25 | 15-25 | 10-20 |
| Silica | 5 | 5 | 20-30 | 15-25 |
| Latex | 2 | 2 | | |
| WSR | X2 | X2 | | |
| Secondary Layer | | | | |
| Carbon Fiber | 15% | 15% | | |
| Deposit Amount (lb)Carbon | 2 | 3 | 2 | |
| Deposit Amount (lb)Celite | 4 | 6 | 8 | |
| Latex % | 2 | 2 | | |
| Basis Weight | 165.5 | 168 | | |
| Caliper | 29.5 | 30 | | |
| Porosity | 21.9 | 21.7 | | |
| Dry Tensile | 7750 | 7014 | | |
| Wet tensile | 4957 | 4439 | | |
| Ash | 14.85 | 16.56 | | |

Example II

The μPVT torque curves provide further information about the materials of the present invention.

FIGS. 1a and 1b the torque curves (μPVT) for Comparative example A at various levels and speed at 110° C. (FIG. 1a) and at 50° C. (FIG. 1b).

FIGS. 2a and 2b the torque curves (μPVT) for Comparative example B at various levels and speed at 110° C. (FIG. 2a) and at 50° C. (FIG. 2b).

FIGS. 3a and 3b the torque curves (μPVT) for Example 1 at various levels and speed at 110° C. (FIG. 3a) and at 50° C. (FIG. 3b).

FIGS. 4a and 4b the torque curves (μPVT) for Example 2 at various levels and speed at 110° C. (FIG. 4a) and at 50° C. (FIG. 4b).

Example III

Example III shows the S12 μ-PVT test showing the initial coefficient of friction μi, dynamic coefficient (μd) and the final coefficient of friction (μo) and the ratio of μo/μd for the speeds shown.

FIGS. 5a-5d are graphs comparing the initial (μi) (FIG. 5a), dynamic (μd) (FIGS. 5b), and final (μ0) (FIG. 5c) coefficients of friction and the ratio of final/dynamic (μ0)/(μd) (FIG. 5d) coefficient of friction to the apply facing pressure, kPA, for Comparative Ex. A.

FIGS. 6a-6d are graphs comparing the initial (μi) (FIG. 6a), dynamic (μd) (FIGS. 6b), and final (μ0) (FIG. 6c) coefficients of friction and the ratio of final/dynamic (μ0)/(μd) (FIG. 6d) coefficient of friction to the apply facing pressure, kPA, for Comparative Ex. B.

FIGS. 7a-7d are graphs comparing the initial (μi) (FIG. 7a), dynamic (μd) (FIGS. 7b), and final (μ0) (FIG. 7c) coefficients of friction and the ratio of final/dynamic (μ0)/(μd) (FIG. 7d) coefficient of friction to the apply facing pressure, kPA, for Example 1.

FIGS. 8a-8d are graphs comparing the initial (μi) (FIG. 8a), dynamic (μd) (FIGS. 8b), and final (μ0) (FIG. 8c) coefficients of friction and the ratio of final/dynamic (μ0)/(μd) (FIG. 8d) coefficient of friction to the apply facing pressure, kPA, for Example 2.

Example IV

Example IV shows a high speed step level test. FIG. 9a is a graph showing the test conditions for conducting a high speed step level "hot spot" test using automatic transmission fluid "B".

Figure 9B:
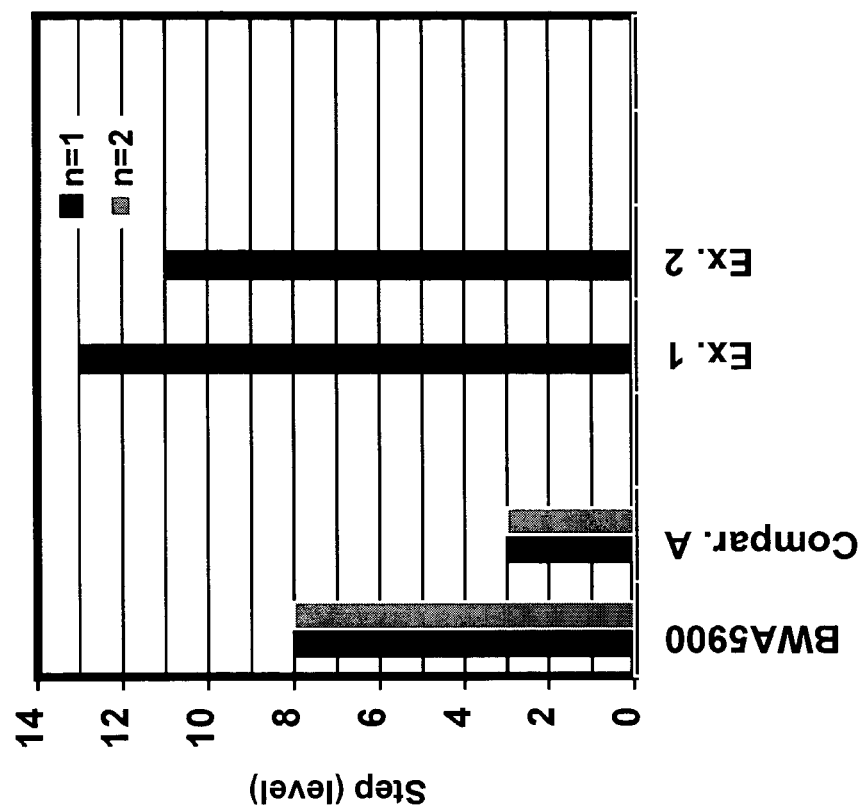
FIG. 9b is a graph the high speed step level "hot spot" test results for the Comparative example A, the Comparative example B, the Example 1, and the Example 2.
Figure 9A:
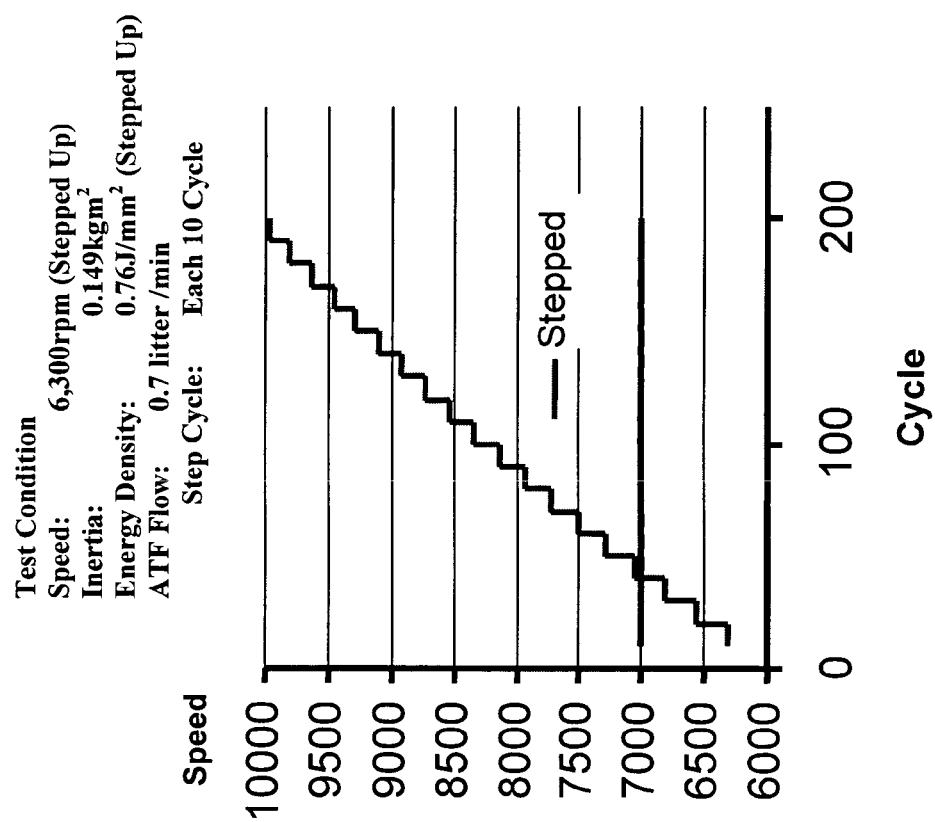
FIG. 9a is a graph showing the test conditions for conducting a high speed step level "hot spot" test using automatic transmission fluid "B".

FIG. 9b is a graph the high speed step level "hot spot" test results for the Comparative example A, the Comparative example B, the Example 1, and the Example 2.

Example V

Example V shows the results of high speed step level tests using transmission fluid "B" where the examples of the present invention show less thickness loss and better coefficient of friction levels. FIG. 10a is a graph showing the mid coefficient of friction for Ex. 1, Ex. 2 and Compar. B.

Figure 10B:
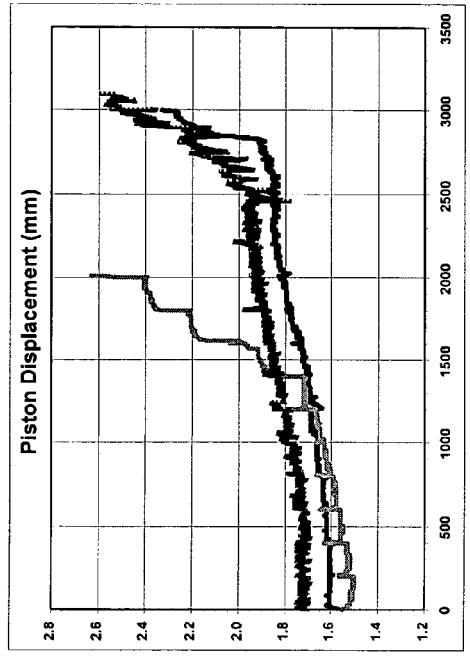
FIG. 10b is a graph showing the piston displacement (mm) for Ex. 1, Ex. 2 and Compar. B.

FIG. 10b is a graph showing the piston displacement (mm) for Ex. 1, Ex. 2 and Compar. B. In addition, the examples of the present invention lasted for more cycles than the comparative materials.

Figure 10D:
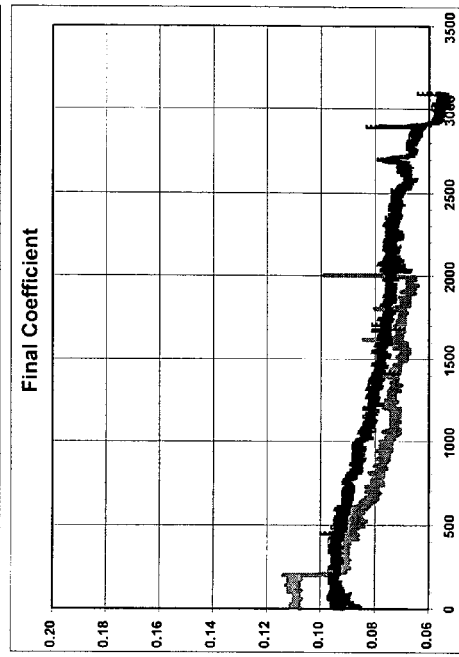
FIG. 10d is a graph showing the final coefficient of friction for Ex. 1, Ex. 2 and Compar. B.
Figure 10A:
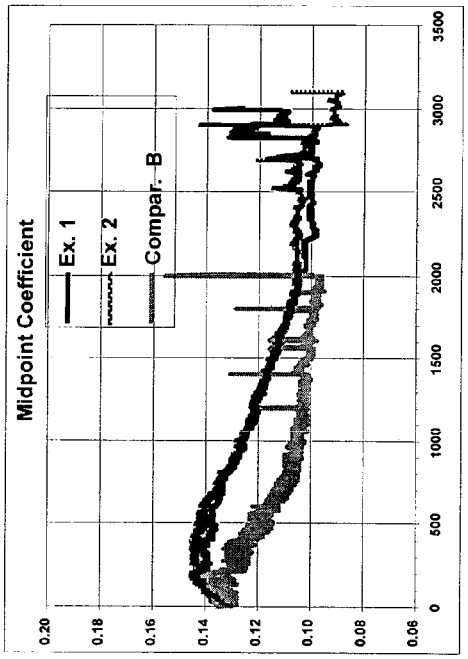
FIG. 10a is a graph showing the mid coefficient of friction for Ex. 1, Ex. 2 and Compar. B.
Figure 10C:
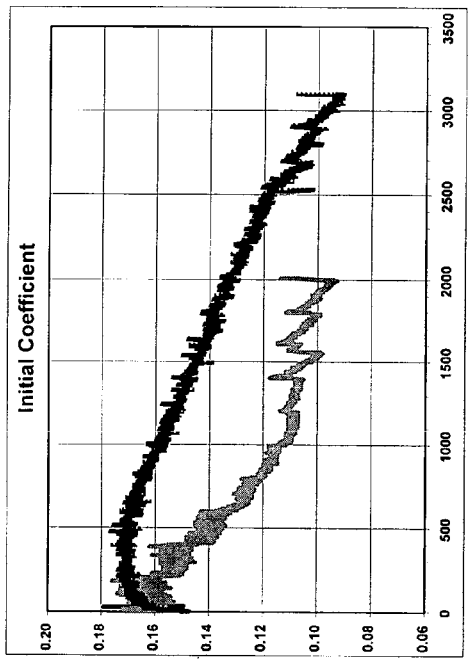
FIG. 10c is a graph showing the initial coefficient of friction for Ex. 1, Ex. 2 and Compar. B.

FIG. 10c is a graph showing the initial coefficient of friction for Ex. 1, Ex. 2 and Compar. B.

FIG. 10d is a graph showing the final coefficient of friction for Ex. 1, Ex. 2 and Compar. B.

Example VI

Figure 11:
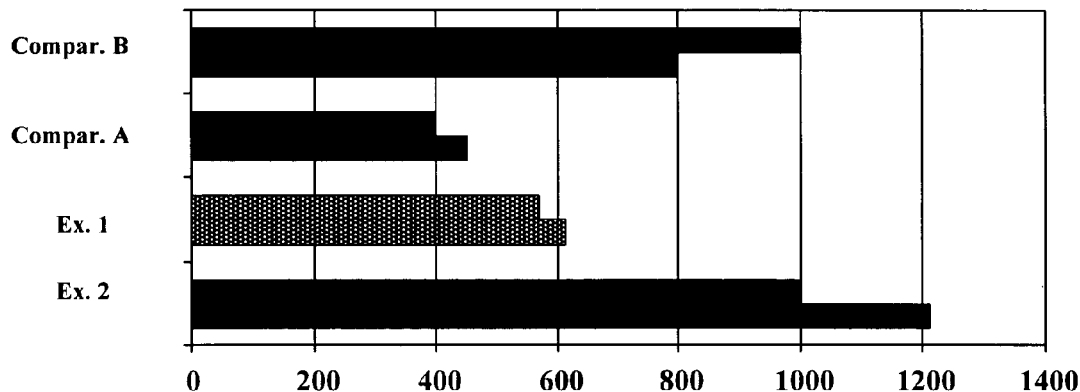
FIG. 11 is a graph showing the high speed durability test for Ex. 1, Ex. 2, Compar. A, and Compar. B.

Example VI shows the results of a S18 high speed durability test. FIG. 11 is a graph showing the high speed durability test for Ex. 1, Ex. 2, Compar. A, and Compar. B where the Example 2 of the present invention performed for more that 1200 cycles.

Example VII

Figure 12:
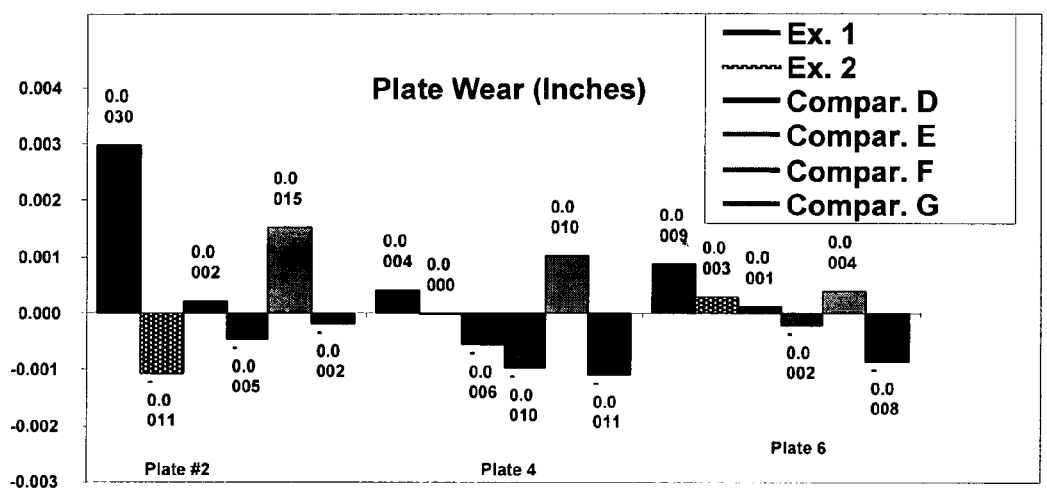
FIG. 12 is a graph showing plate wear (inches) for Ex. 1, Ex. 2, Compar. D, Compar. E. Compar. E, Compar. F, and Compar. G at 6000 rpm.

Example VII shows the results of plate wear in inches at 6000 rpm. FIG. 12 is a graph showing plate wear (inches) for Ex. 1, Ex. 2, Compar. D, Compar. E. Compar. E, Compar. F, and Compar. G at 6000 rpm where these comparative materials have different primary layers and secondary layers.

Example VIII

Example VIII shows the physical properties for comparative examples B and comparative example C and for examples 1 and 2.

Figure 13:
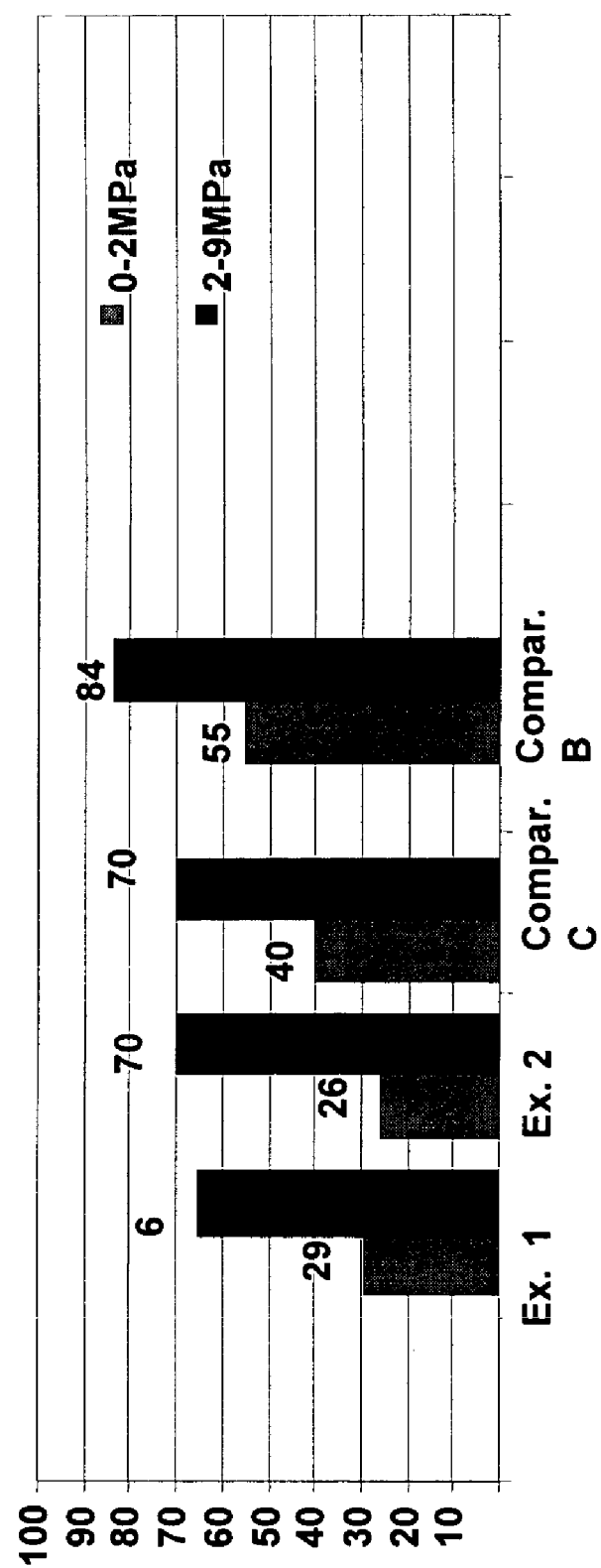
FIG. 13 is a graph showing the compression modulus for Example 1, Example 2, Comparative example B, and Comparative example C.

FIG. 13 shows the compression modulus for 0 to 2 MPA and for 2-9 MPA for these materials. It should be noted that the lower the modulus, the higher the elasticity of the material. The material of the present invention have a very desirable elasticity.

Example VIV

Example VIV shows the μ-v durability test using automatic transmission fluid "B".

FIG. 14*a* is a graph showing the μ-V durability relationship (constant speed method) for Example 1 showing the cycles at 1, 5, 10, 15, 20, 25 and 30 by comparing the coefficient of friction (μ) to the slip speed (rpm).

FIG. 14*b* is a graph showing the slope vs. cycle for the Example 1.

FIG. 15*a* is a graph showing the μ-V durability relationship (constant speed method) for Example 2 showing the cycles at 1, 5, 10, 15, 20, 25 and 30 by comparing the coefficient of friction (μ) to the slip speed (rpm).

FIG. 15*b* is a graph showing the slope vs. cycle for the Example 2.

INDUSTRIAL APPLICABILITY

The present invention is useful as a high energy friction material for use with clutch plates, transmission bands, brake shoes, synchronizer rings, friction disks or system plates.

The above descriptions of the preferred and alternative embodiments of the present invention are intended to be illustrative and are not intended to be limiting upon the scope and content of the following claims.

I claim:

1. A friction material comprising a fibrous base material impregnated with at least one curable resin, the fibrous base material comprising a porous primary layer and a secondary layer, the porous primary layer comprising less fibrillated aramid fibers having a freeness of greater than 300 on the Canadian Standard Freeness index, a silica filler material, synthetic graphite particles, and at least one of cotton fibers or carbon fibers, the secondary layer comprising a mixture of carbonaceous material and silica friction modifying particles on at least one surface of the primary layer, wherein the silica friction modifying particles have an average size ranging from about 0.5 to about 20 microns, and wherein the carbonaceous material comprises at least one of carbon fibers having an average length that ranges from about 0.5 to about 6 mm, or carbon particles having an average diameter that ranges in size from about 1 to about 80 μm.

2. The friction material of claim 1, wherein the secondary layer comprises about 5% to about 35%, by weight, of the mixture of carbonaceous material and silica friction modifying particles, based on the weight of the fibrous base material.

3. The friction material of claim 1 wherein the secondary layer comprises a mixture of carbon particles and silica particles.

4. The friction material of claim 3, wherein the mixture of carbon particles and silica friction modifying particles is present at about 0.2 to about 20%, by weight, based on the weight of the fibrous base material, the mixture of carbon particles and silica friction modifying particles covering about 3% to about 30% of the surface area of the primary layer.

5. The friction material of claim 3, wherein the secondary layer comprises about 20% to about 35%, by weight, of silica particles, and about 65% to about 80%, by weight, of carbon particles, based on the total weight of the mixture of carbon particles and silica particles.

6. The friction material of claim 3, wherein the secondary layer comprises a mixture of i) diatomaceous earth particles and ii) fully carbonized carbon particles or partially carbonized carbon particles, and mixtures thereof 7. The friction material of claim 1, wherein the fibrous base material defines pore diameters ranging in mean average size from about 2.0 to about 25 microns.

8. The friction material of claim 1, wherein the primary layer has readily available air voids of at least about 50%.

9. The friction material of claim 1, wherein the less fibrillated aramid fibers have a freeness of about 350 to about 650 on the Canadian Standard Freeness index.

10. The friction material of claim 1, wherein the less fibrillated aramid fibers have average fiber lengths in the range of about 0.5 to about 10 mm.

11. The friction material of claim 1, wherein the silica filler material comprises diatomaceous earth.

12. The friction material of claim 1, wherein the porous primary layer comprises about 50 to about 60%, by weight, less fibrillated aramid fibers; about 40 to about 10%, by weight, cotton fibers; about 5-15%, by weight, carbon fibers; about 20 to about 30%, by weight, synthetic graphite particles; and, about 5 to about 15%, by weight, silica filler material.

13. The friction material of claim 1, impregnated at about 35 to about 40% resin, by weight, with at least one of: a phenolic resin, a modified phenolic resin, or a mixture of a phenolic resin and a silicone resin wherein the amount of silicone resin in the mixture ranges from approximately 5 to approximately 80%, by weight, based on the weight of the mixture wherein the phenolic resin is present in a solvent material and the silicone resin is present in a solvent material which is compatible with the solvent material of the phenolic resin.

14. The friction material of claim 1, wherein the less fibrillated aramid fibers have a freeness of about 430 to about 650 on the Canadian Standard Freeness index.

15. The friction material of claim 1, wherein the porous primary layer comprises about 50 to about 60%, by weight, less fibrillated aramid fibers; about 5 to about 20%, by weight, carbon fibers; about 20 to about 30%, by weight, synthetic graphite particles; and, about 3 to about 15%, by weight, silica filler material.

16. A process for producing a friction material comprising:
forming a porous primary layer comprising less fibrillated aramid fibers having a freeness of greater than 300 on the Canadian Standard Freeness index, a silica filler material, synthetic graphite particles, and at least one of cotton fibers or carbon fibers, coating about 3% to about 90% of at least one surface of the porous primary layer with a mixture of carbonaceous material and silica friction modifying particles to form a fibrous base material, the mixture of carbonaceous material and silica friction modifying particles being present at about 0.2 to about 20%, by weight, based on the weight of the fibrous base material, and impregnating the fibrous base material with a phenolic resin, phenolic-based or a phenolic-silicone resin mixture, and thereafter curing the impregnated fibrous base material at a predetermined temperature for a predetermined period of time.

17. The process of claim 16, wherein the porous primary layer comprises, by weight, about 40 to about 60% of less fibrillated aramid fibers, about 5 to about 20% carbon fibers, about 10 to about 20% cotton fibers, about 3 to about 15% silica filler material, and further comprises about 3 to about 15% carbon particles and about 0 to about 3% of a latex material.

18. The process of claim 17, wherein the porous primary layer comprises less fibrillated aramid fibers having a freeness of at least about 430 to about 650 on the Canadian Standard Freeness (CSF) index.

19. The process of claim 16, wherein the carbonaceous material comprises carbon fibers having an average length that ranges from about 0.5 to about 6 mm and an average diameter that ranges from about 1 to about 15 µm.

20. The friction material of claim 1, wherein the porous primary layer comprises about 20% to about 40%, by weight, of synthetic graphite particles.

21. The friction material of claim 1, wherein the carbonaceous material comprises fully carbonized carbon fibers or partially carbonized carbon fibers that have an average length that ranges from about 0.5 to about 6 mm and an average diameter that ranges from about 1 to about 15 µm.

22. A fibrous base material impregnated with at least one curable resin, the fibrous base material comprising a porous primary layer and a secondary layer comprising a mixture of carbon particles and silica friction modifying particles on at least one surface of the primary layer, wherein the carbon particles have an average diameter that ranges in size from about 1 to about 80 µm and the silica friction modifying particles have an average size ranging from about 0.5 to about 20 µm, wherein the mixture of carbon particles and silica friction modifying particles is present at about 0.2 to about 20%, by weight, based on the weight of the fibrous base material, and wherein the secondary layer comprises about 20% to about 35%, by weight, of silica particles, and about 65% to about 80%, by weight, of carbon particles, based on the total weight of the mixture of carbon particles and silica particles.

* * * * *